Nov. 12, 1968   G. H. GUESS   3,410,197
COFFEE MAKING MACHINE
Filed Nov. 19, 1964   3 Sheets-Sheet 1

INVENTOR.
GEORGE H. GUESS
BY
Newton, Hopkins & Jones
ATTORNEYS

Nov. 12, 1968 G. H. GUESS 3,410,197
COFFEE MAKING MACHINE
Filed Nov. 19, 1964 3 Sheets-Sheet 3
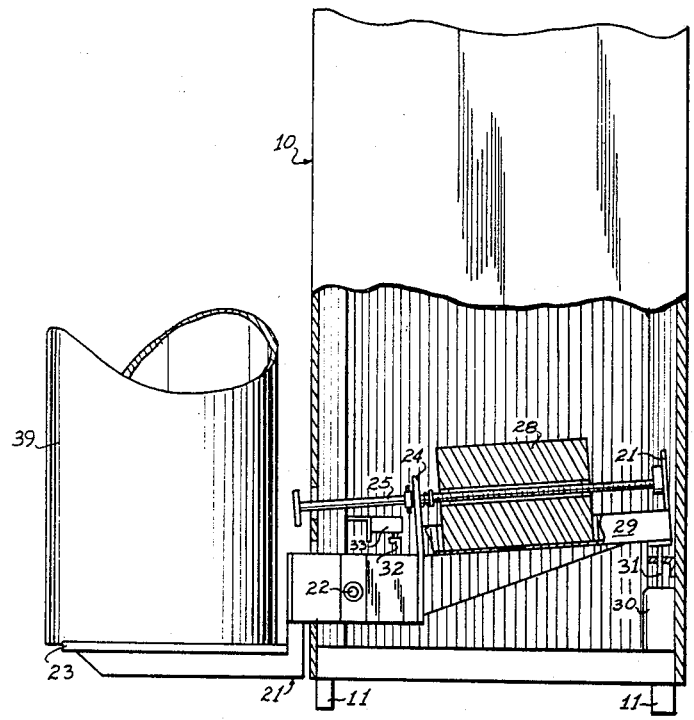
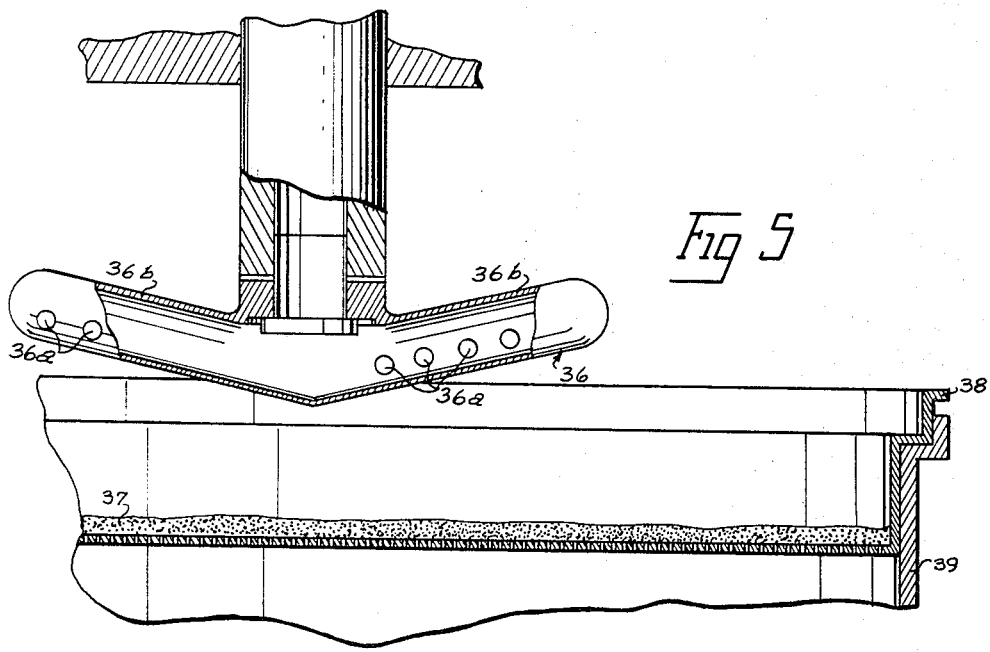
INVENTOR.
GEORGE H. GUESS
BY
Newton, Hopkins & Jones
ATTORNEYS

United States Patent Office 3,410,197
Patented Nov. 12, 1968

3,410,197
COFFEE MAKING MACHINE
George H. Guess, 2108 S. Highland Park Ave.,
Chattanooga, Tenn. 37404
Filed Nov. 19, 1964, Ser. No. 412,468
6 Claims. (Cl. 99—298)

ABSTRACT OF THE DISCLOSURE

A coffee making machine including a large heated water tank, a series of receiving stations adjacent the water tank for receiving smaller coffee brewing containers, and a control circuit for automatically filling the water tank and transferring water from the water tank to the coffee brewing containers.

---

In the distribution of freshly brewed coffee in large restaurants and cafeterias, but more particularly in the distribution of coffee from mobile lunch wagons or coffee carts and the like, a substantial problem is the provision of large quantities of freshly brewed coffee for rapid distribution in individual servings. If, for instance, the distribution is in the neighborhood of over two hundred, six ounce cups of coffee within a lunch period of one hour, ten gallons of coffee will be required. Conventional restaurant, cafeteria and institutional coffee makers are of five gallons capacity providing approximately one hundred, six ounce cups of coffee and the brewing time may range from ten to twenty minutes. Moreover, conveniently portable coffee brewing equipment of five gallon capacity, suitable for lunch carts or coffee wagons, is not readily available. There is therefore a need for hot freshly brewed coffee in bulk quantities up to five gallons and multiples thereof, particularly by mobile coffee carts or wagons where the equipment and time requirements are prohibitive.

It is an object of the present invention to provide an effective and efficient means for brewing coffee in large portions and successive or simultaneous multiples thereof at a central location from which it may be distributed in large quantities for transportation to various points of ultimate consumption. Apparatus for the continuous brewing of coffee usually for the purpose of desiccation to powdered coffee or to coffee concentrates are known; however, such equipment does not lend itself to the preparation of large quantities of potable coffee to be subsequently distributed as individual cups at substantially brewing temperature, nor does such apparatus lend itself to rapid fulfillment of sudden demands for multiple gallon batches of freshly brewed coffee.

It is therefore among the objects of the present invention to provide a coffee making machine by which separate portions of predetermined large quantities of coffee may be rapidly prepared as the occasion requires.

Another object of the invention is to provide means by which multiple portions of coffee may be brewed simultaneously, to meet the requirements of the specific orders as they are received and/or in rapid succession.

A ufrther object of the present invention is to provide means by which the various large portions of coffee, of from one to five gallons, may be rapidly prepared.

A further object of the present invention is to provide a novel, improved, effective and efficient means for preparing multiple portions of large quantities of coffee.

An important feature of the invention, is the fact that coffee is brewed by the present apparatus from ground and roasted coffee beans and does not resort to the use of powdered coffee or coffee concentrate which in their preparation may have lost some of the qualities of taste and aroma of freshly brewed coffee and insures uniform quality and strength between portions and from day to day.

Numerous other objects and features of the present invention will be apparent from the following specification taken in conjunction with the accompanying drawings, in which:

FIG. 4 is a fragmentary detailed view illustrating the balancing means whereby variously predetermined portions of coffee may be brewed at an elected station of the machine.

FIG. 5 is a detailed fragmentary view taken at one of the stations illustrating the hot water discharge device in combination with the coffee tray and container to provide rapid brewing.

Figure 1:
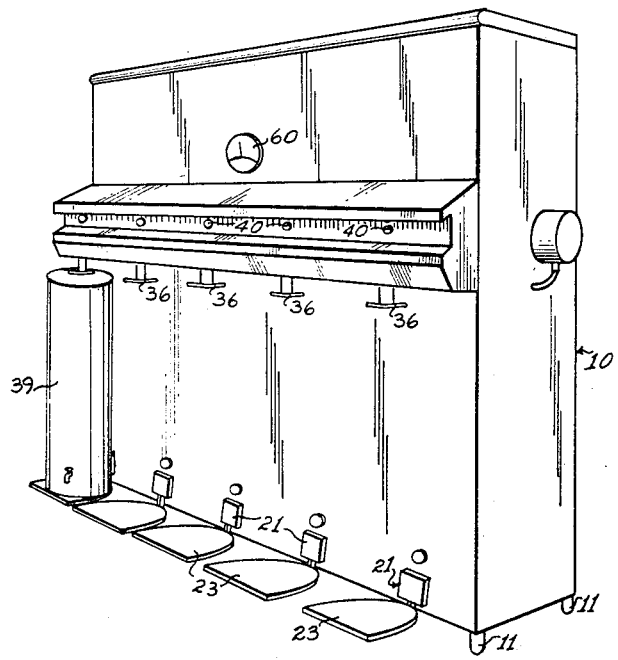
FIG. 1 is a perspective view of one form of the present invention.

In the drawings, numeral 10 indicates generally a rectangular enclosing cabinet of the apparatus which is preferably supported by adjustable corners of legs 11. Within the upper section of the cabinet there is provided a metal or glass water tank 12 surrounded by heat insulation material 13 and resting upon a heat insulation shelf 14. While the dimensions and capacities of the present apparatus are not critical, insofar as the present inventive concept is concerned, it may, for the sake of illustration, be considered that the tank 12 of the present form of invention has a capacity of approximately 165 gallons. Within the lower portion of the tank 12 longitudinally extending electric resistance type heaters 15 are provided by which the water in the tank may be elevated to approximately 210° F. Water is supplied to the tank by pipe 16 under control of an electrically actuated valve 17. A suitable preheating means (not shown) is provided for the water supply by which the water admitted to the tank is admitted thereto at approximately 170° F., thus relieving the heaters 15 from the task of raising water at normal supply temperature to the full 210° F.

For maintaining a desired quantity of water in tank 12, low level and high level electrostatically responsive water level probes 18 and 19 are provided. This arrangement is such that the vertical spacing between the probes 18 and 19 conforms with water level differences within the tank 12 representing approximately 40 gallons. The probes 18 and 19, as indicated by the electrical diagram of FIG. 2, control the inlet water valve 17, the arrangement being such that as the water level descends below the lower probe 19 a circuit is established to open the valve 17 to admit water at 170° F. to tank 12. Valve 17 will be retained open by the probe 19 until forty gallons of water are supplied, at which time the level reaches the upper probe 18, the circuit arrangement being such that completion of the circuit through the probe 18 will close the valve 17. By this arrangement it will be seen that during the flow of forty gallons of water from the tank 12, no additional water is supplied to the tank. Thus, it will be seen that eight five gallon portions of coffee may be brewed while the temperature of the tank is maintained at 210° F. without diminishing that temperature by the addition of water during the brewing of the forty gallons of coffee. By suitable selection of the heating elements 15 and thermostatically responsive control thereof, the time required for reheating the entire contents of the tank to 210° after it is refilled with forty gallons of water from the level of the lower probe 19 to the level of the upper probe 18 by the addition of forty gallons of water at 170° F., may be suitably controlled.

Adjacent the bottom of cabinet 10 there are provided a plurality of brackets 21 here shown as five in number.

Each bracket is pivotally mounted as indicated at 22 and includes a forwardly projecting coffee receptacle pedestal 23 mounted at the front of the cabinet. Inwardly of the pivotal mounting of the brackets, each bracket includes an upwardly projecting balance arm 24, rotatably supporting a threaded counterbalance rod 25. Rod 25 extends forwardly through the front 26 of the cabinet to receive a manually operable control knob 27 by which the rod 25 may be rotatably adjusted. Threadedly mounted on the rod 25 there is provided a counterweight 28, longitudinally adjustable by rotation of the rod 25, to vary the counterbalancing weight applied to the brackets 21. The bracket 21 is rearwardly extended to provide a slide way 29 for the counterweight 28. For restraining the pivotal movement of the bracket 21, a dash pot check assembly 30 is provided connected by rod 31 with the inner end of the bracket 21. Forwardly of the balance arm 24, each bracket 21 is provided with a microswitch operating contact 32 for actuating a microswitch 33.

Above each of the pedestals 23 there is provided a hot water spray discharge arrangement including a pipe 34 leading from the tank 12, a solenoid operated control valve 35, and a rotary water discharge head 36 (see FIG. 5). Each valve 35 is under the control of a push button starter button 40, at each pedestal and hot water discharge station, which opens the valve 35, a holding circuit (see FIG. 2) retains the valve open until the microswitch 33 is actuated to open the holding circuit. This arrangement is such that when a container 39 is placed upon one of the pedestals 23 and the button 40 is operated to open the electrically associated valve 35, water at 210° F. will be sprayed upon ground roasted coffee beans 37 thinly spread upon a shallow dish shaped, perforated coffee holder 38 removably mounted in the upper end of the coffee container 39. When the weight of the container and the water supplied thereto overbalances the counterweight 28, the bracket 21 will rock in counterclockwise direction whereby contact 32 actuates microswitch 33, to break the opening circuit to valve 35, terminating the water flow.

Figure 2:
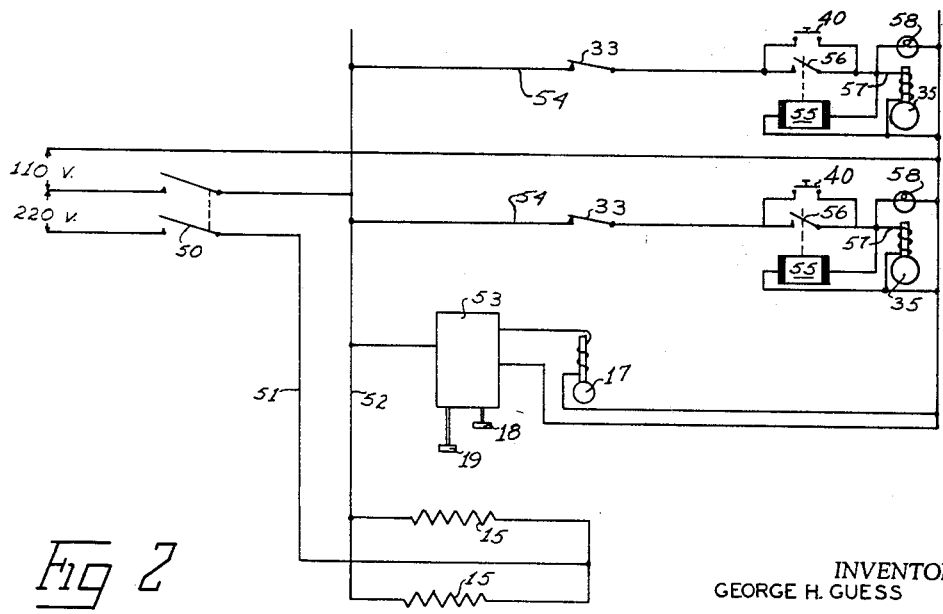
FIG. 2 is a schematic wiring diagram of an electrical circuit which may be employed with the apparatus illustrated in FIG. 1.
Figure 3:
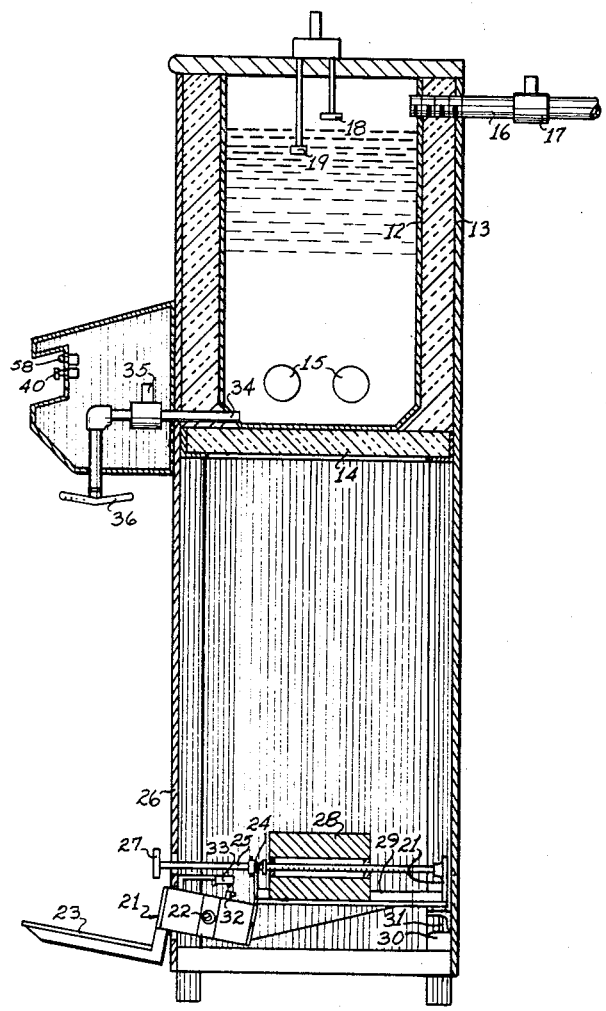
FIG. 3 is a vertical sectional view through the coffee making machine of FIG. 1.

Referring now to the circuit diagram of FIG. 2, it will be seen that 220 volt power is supplied through the main control switch 50, through conductors 51 and 52, to the heating elements 15 of the tank 12. The conductor 52 supplies power to the control box 53 for the probes 18 and 19 associated with the inlet water valve 17. Since the return conductor 54 of this circuit is associated with the grounded leg, the current flow through this circuit will be at 110 volts. Similarly, each of the circuits for each brewing station includes a conductor 54 from the conductor 52, with the microswitch 33 in the line. Conductor 54 leads to the starter button switch 40 and a holding coil 55 for the switch 56 in parallel with the starter button switch. From the switch 56 the conductor 57 leads to the coil of the valve 35 of each station. Parallel with the activating coil of valve 35 is arranged an indicator bulb 58 parallel with the coil of valve 35.

From the foregoing it will be seen that in the operation of the present coffee making machine the tank 12 is first filled with water through the pipe 16 herein suggested as 165 gallons, by opening of a manual valve (not shown). When the desired water level, indicating the preferred tank capacity, is reached, the probe 18 will act to close the water intake valve 17. The thermostatically controlled heating coils 15 will then raise the water temperature to approximately 210° F. When the desired temperature is reached as indicated by the thermometer 60, the machine is ready for the brewing of one or more five gallon portions or fractions thereof. Open topped five gallon containers 39 are placed on the pedestals 23. In the open top of each container the perforate coffee holder 38 is placed with the ground coffee 37 evenly distributed over its surface. At each station the counterweight 28 is set to be overbalanced by a predetermined weight, and thus determine the volume of brewed coffee in the container 39 mounted on its pedestal 23.

With the apparatus so arranged, only one, or a plurality of the starter buttons 40 may be depressed whereupon the valve 35 associated therewith will open to permit the flow of scalding water through its associated pipe 34 to be sprinkled and evenly distributed through its rotary discharge head 36 upon the ground coffee 37 whereby the coffee is leached to provide the finished brew. An important feature of the apparatus is the rotary discharge head 36 and its advantageous effect in the speed and economy of coffee brewing. The apertures 36a of each tilted discharge wing 36b are oppositely directed to produce automatic rotation of the head as water is discharged therethrough. The angularity of the discharge wings insures a uniform spray of the entire surface of the coffee. Thus all of the coffee is rapidly and uniformly saturated to provide fast and effective brewing. When the quantity of any container reaches that for which the counterweight is set, the bracket 21 will pivot to close the circuit of microswitch 33 to open the circuit of valve 35 and terminate the water flow to that particular container.

Thus, if an original order is for twelve gallons, counterweights of two stations may be set for the weight of five gallons, the usual capacity of the containers 39 of the present form of the invention, while a third station is set for two gallons. The buttons 40 of these three stations are then depressed and coffee will thus be simultaneously brewed for each container in the quantity for which its station is set. Therewith or thereafter coffee may be prepared for an order of nine gallons by setting one of the other stations for five gallons and the remaining station for four gallons and these buttons 40 depressed. Obviously, all five stations may simultaneously or in overlapping succession prepare a full five gallons at each station. It is to be noted that, since no refill of water for the tank 12 is permitted until forty gallons at 210° F. is discharged, in five gallon batches, or any variation in portions up to this total, time is required to elevate the total temperature when cooler water replenishes the tank. However, since the refilled water is preferably supplied after preheating to approximately 170° F., such time will be of short duration.

In the practice of the invention it will be understood that the capacities and temperatures referred to are by way of example and are in no way critical as to the inventive concept. In like manner, the details of structure herein depicted are illustrative, thus numerous changes, modification and the full use of equivalents may be resorted to without departure from the spirit or scope of the invention as defined in the appended claims.

What is claimed as invention is:

1. A coffee making machine comprising a water tank, means for maintaining the level of water in said tank between two preselected levels, and means for heating the water in said tank, a plurality of dispensing stations adjacent said tank each arranged to receive a coffee brewing container, a weight actuated switch positioned at each dispensing station and movable under the weight of a coffee brewing container, conduit means communicating with said tank and extending toward each of said dispensing stations, for dispensing water to a coffee brewing container, and valve means for each dispensing station responsive to the weight actuated switch of its dispensing station for controlling the flow of water from said tank to a dispensing station and its coffee brewing container.

2. Coffee making apparatus comprising a water tank including level control means for maintaining water within said tank above a predetermined level and means for heating the water within said tank, a plurality of coffee brewing stations adjacent said tank, dispensing means for flowing water from said tank selectively to one or more of said stations simultaneously, and flow terminating means responsive to the amount of water dispensed to each station for terminating the flow of water to that station.

3. The invention of claim 2 wherein said flow terminating means comprises a weight actuated switch.

4. The invention of claim 2 wherein said water tank level control means comprises actuating means for initiating the flow of water into said tank and terminating means for stopping the flow of water into said tank, said actuating means and terminating means being constructed and arranged to operate independently of said dispensing means.

5. The invention of claim 2 wherein said dispensing means is constructed and arranged to flow water from said tank to said dispensing stations primarily only under the force of gravity.

6. The invention of claim 2 wherein said dispensing means each include a rotary discharge head for dispensing the water dispensed from said tank.

References Cited

UNITED STATES PATENTS

| Re. 22,879 | 5/1947 | Peters et al. | 99—282 |
| 2,644,478 | 7/1953 | Calabrese | 137—263 |

WILLIAM I. PRICE, *Primary Examiner.*